(12) United States Patent
Visentin

(10) Patent No.: US 9,701,439 B2
(45) Date of Patent: Jul. 11, 2017

(54) COMPOSITE STAINLESS STEEL AND WOOD BARREL

(71) Applicant: Bruno Visentin, Rijeka (HR)

(72) Inventor: Bruno Visentin, Rijeka (HR)

( * ) Notice: Subject to any disclaimer, the term of this patent is extended or adjusted under 35 U.S.C. 154(b) by 0 days.

(21) Appl. No.: 14/412,922

(22) PCT Filed: Jul. 3, 2013

(86) PCT No.: PCT/HR2013/000019
§ 371 (c)(1),
(2) Date: Jan. 5, 2015

(87) PCT Pub. No.: WO2014/006431
PCT Pub. Date: Jan. 9, 2014

(65) Prior Publication Data
US 2015/0321790 A1 Nov. 12, 2015

(30) Foreign Application Priority Data
Jul. 4, 2012 (HR) ................ P20120544A

(51) Int. Cl.
*B65D 85/72* (2006.01)
*B65D 8/00* (2006.01)

(52) U.S. Cl.
CPC ............ *B65D 15/10* (2013.01); *B65D 9/04* (2013.01); *B65D 85/72* (2013.01)

(58) Field of Classification Search
CPC .......... B65D 85/72; B65D 9/04; B65D 15/10; B65D 15/06; B65D 9/06
USPC .............................. 99/277.1, 277; 220/23.91
See application file for complete search history.

(56) References Cited

U.S. PATENT DOCUMENTS

| 4,953,730 A | 9/1990 | Prime et al. | |
| 2007/0199937 A1* | 8/2007 | Schutz | A62C 2/065 220/23.91 |
| 2011/0268838 A1* | 11/2011 | Vondrasek | B65D 39/00 426/15 |

* cited by examiner

*Primary Examiner* — Stephen Castellano
(74) *Attorney, Agent, or Firm* — Daniel P. Burke & Associates, PLLC

(57) ABSTRACT

The invention relates to a composite stainless steel and wood barrel comprising a metal body, to which a gasket made of appropriate liquid-resistant material is attached. The wooden slats are inserted into a metal frame and tightened in a vertical sense with screws. The metal frame filled with slats, is attached to the metal body with screws. An arbitrary number of various connecting elements for attaching the fermentor, the inert gas system, the pump and for wine-sampling are added to the metal body. The structure provides for the barrel to be mounted on metal legs which, apart from providing stable positioning of the barrel, enables the barrels to be arranged in a row 10 cm apart from each other and is also used for raising the body of the barrel 40 cm from the ground, thus facilitating decantation.

14 Claims, 5 Drawing Sheets

COMPOSITE STAINLESS STEEL AND WOOD BARREL

This application is the national stage (Rule 371) of PCT/HR2013/000019 filed Jul. 3, 2013.

DESCRIPTION OF THE INVENTION

Field of the Invention

This invention relates to casks which body is made by joining two or more rigid elements that are made of metal, wood, plastic or the like.

This invention is classified according to the International Patent Classification (IRC) in group B 65 D 5/00.

Technical Problem

Wooden barrels are indispensable cellar inventory of the vast majority of wine producers, especially for producing finest-quality red wines. The barrique barrel holds a special place among the wooden barrels, which because of its optimal shape, i.e. it provides the optimal wine volume to wood surface area ratio during the aging process, has become the accepted standard. The world most renowned barrel is the 225-liters Bordeaux barrique. The term barrique also stands for the wine aging technique as well as for the wine that has aged in these barrels. The Bordeaux barrique barrel's dimension has been established in 1858 by the Bordeaux Chamber of Commerce.

Wooden barrels, however, have major drawbacks:

Making barrels is a very complex process that employs a lot of hand work. This results in high production costs and high sales prices.

Barrels need to be replaced because over time, as the pores become clogged with tartarat deposits, microoxydation capacity decreases. Also, over time, the amount of redundant aromatic compounds of the wood is reduced. Barrique barrel's life cycle is around three years.

Cleaning small wood and barrique barrels is hard because of difficulty in accessing the inside. This can cause the growth of mold, yeast *Brettanomyces* and acetic bacteria in general, barrique barrels and small casks occupy a lot of space.

PRIOR ART

For more than 2,000 years, wine has been stored in barrels. Even today, the majority of premium quality red wines, and an occasional white wine, are aged (even fermented) in wooden barrels in order to improve their quality during the aging process. The chemical-physical extraction of aromatic and other compounds from the wood and the microoxydation that occurs as a result of the passage of oxygen through the pores of the wood and the stave joints and thus affecting the maturation of the wine, are the two major factors of how the barrel affects the wine. The combined effects of oxidation and extraction causes: decarboxylation, spontaneous cleaning of wine, loss of colloidal colored compounds, stabilization of tartarats, condensation and polymerization of tannins and anthocyanins, and the yielding of over 40 aromatic compounds from the furan, phenolic aldehyde, phenol and lactone groups. This results in the creation of the so-called tertiary aromas that are highly appreciated in wine, and in general, in the creation of different aromatic profiles, in the stabilization of color, the control of the oxidation-reduction processes (ellagitannins), and in the prolongation of the wine aging capacity.

Wood substance extraction and oxidation are determined by several factors, primarily;

A) the surface area to volume ratio
B) the type of wood and its provenance
C) the toasting method
D) the thickness of the staves A) The surface area to volume ratio is the main regulator of the amount of substances that will be extracted from the wood and the amount of oxygen that will be transferred to the wine. The smaller the barrel, the larger the surface to volume ratio and thus the faster the extraction and oxidation processes will occur.

TABLE

Surface area to volume ratio for different barrel sizes

| Volume in liters | Barrel surface area in $cm^2$/liter |
|---|---|
| 100 | 114 |
| 200 | 90 |
| 225 | 87 |
| 400 | 72 |
| 500 | 66 |
| 750 | 58 |
| 1,000 | 53 |
| 1,500 | 46 |
| 2,000 | 42 |
| 3,000 | 37 |
| 5,000 | 31 |
| 7,500 | 27 |
| 10,000 | 24 |

B) Type of Wood and its Provenance

The most important types of wood used for making barrels are:

*Quercus robur* L.
*Quercus petraea* L.
*Quercus alba* L.

Oak trees native to most of Europe are *Quercus robur*. which in general, contains a high concentration of extractable polyphenols and a relatively low concentration of volatile aromatic compounds; and the *Quercus petraea*. which generally has a high aromatic potential and a low content of extractable ellagitannins. In the United States, the dominant species is the American white oak (*Quercus alba*), which has a low content of phenol and a high concentration of aromatic substances, especially methyl-octalactone. Most of the wood from the United States comes from Kentucky, Missouri, Arkansas and Michigan, and there is no tradition of separating oak according to country or provenance.

The situation in Europe is quite different. Wood is identified according to the place of growth rather than according to species. Accordingly, wood can originate from different countries (France, Croatia, Hungary, Austria, Russia . . . ), regions (Limousin, Solvenina. Allier . . . ) or even forests (Nevers, Trongais . . . ). In practice, the most revered barrels are made of French and Slavonian oak.

Besides oak, chestnut (*Castanea sativa*) and Acacia {*Robinia pseudoacacia*) wood is used for making barrels, although in smaller quantities that have significantly less commercial value.

C) The Toasting Process

In barrel production, toasting has a dual function: first, it allows easier bending of staves to get the characteristic drum features, and second, it has a great impact on the organoleptic characteristics of wine. To be exact, it causes thermal degradation of the chemical constituents of wood thus modifying its structure and giving rise to new chemical compounds. Different temperatures and different lengths of exposure to heat contribute to the creation of various quantities of chemical compounds that make up the barrel's aroma profile.

There are basically four toast levels: light (30 minutes at 120-130° C.), medium (35 minutes at 160-170° C.), medium heavy (40 minutes at 180-190° C.) and heavy (45 minutes at 200-210° C.).

D) Stave thickness depends on the size of the barrel and its manufacturing technique (the inside flat part of the stave may be hollowed out for easier bending): for small barrels the stave thickness is 20 mm, for barrique 22 to 27 mm and for larger barrels (100 hi) up to 80 mm. Although the thickness of the staves establishes the load carrying ability of the wood barrel, thicker wood allows less oxygen transfer.

Because wooden barrels are expensive, especially barrique barrels, winemakers are trying to achieve the same wood barrel effect on the wine by inserting larger or smaller pieces of differently toasted wood (powder, chips) to stainless steel tanks. To a certain degree this technique is successful because a specific amount of wood flavor is added to the wine, but it lacks the microoxydation effect. In truth, there are micro-oxygenation devices that are used to introduce small amounts of oxygen into the wine to mimic the oxidation process in the barrel, but thus far they have failed to do so, hence, the wooden barrel remains the established standard in the production of top quality red wines.

SUMMARY OF THE INVENTION

The present invention is a 225-liter barrel (same capacity as the Bordeaux barrique) that is partially made of stainless steel and partially of wood, which will retain the functional features of a stainless steel tank and at the same time preserve the advantages of a wooden barrel. The barrique barrel's 225-liter volume corresponds to the wood surface area of 19,523 $cm^2$. The concept of the inventive barrel is to attach the same amount of wood surface as in a barrique barrel to the rigid body made out of stainless steel. Wooden slats of proper sizes are inserted into 2 metal frames, which are then attached to the metal structure with screws. For practical reasons that will be explained later on, the wooden slats are 40 mm high and, same as Bordeaux Export barrel's staves, 27 mm wide. Slats inserted into the frame are compressed with a screw placed on top of the frame, thus making the wooden part liquid-tight. The frame containing the slats/staves is mounted on the gasket made out of suitable material and placed around the barrel's metal opening.

Barrel Dimensioning

When deciding on the barrel's size, maximum width was taken into account for stability reasons. Upper and lower parts are slightly curved to allow better draining, to prevent the forming of air bubbles in the upper part of the barrel and to avoid right angles in the vertical section of the barrel.

The barrel is placed on metal legs where the distance between the barrel's bottom and the floor is 400 mm, and the legs in relation to the barrel's axis are slanted in order to gain additional stability and to be able to arrange the barrels in rows spaced 10 cm apart, according to recommendations.

Given conditions:
Volume=225 liters
Wooden surface area=19,523 cm
Height of the arc h on the top and bottom sector=2 cm
Determining the Width and Other Barrel Dimensions:
Aperture height: 25*4+0.5−2*1.4=97.7 cm
Aperture width: 19523/2/97.7=99.9 cm Internal height of the barrel's prismatic part: 97.7+3.7+3=104.4 cm
Internal length of the barrel's prismatic part: 99.9+3+3=105.9 cm To calculate the volume of the cylindrical segment, I established the length of the chord of the top and bottom circular segment.

Length of chord t was obtained using an iterative procedure, and it is:
t=18.798 18.8 cm
Internal barrel width=19.984 20.0 cm
External barrel width=20.2 cm.

To calculate the volume of the cylindrical portion it is necessary to know the radius of the circle and the arc central angle o.

Radius r is obtained by the formula:

$$r = \frac{t^2 + 4h^2}{8h} = \frac{18.8^2 + 4 \cdot 2^2}{8 \cdot 2} 23.09 \text{ cm}$$

Arc central angle a is obtained by the formula $$\alpha = 2 \cdot \arcsin\left(\frac{t}{2r}\right) = 2 \cdot \arcsin\left(\frac{18.8}{2 \cdot 23.09}\right) = 48.05°$$

Area P of the sector is $$P = \frac{r^2 \pi \alpha}{360} - \frac{r^2 \sin\alpha}{2} = \frac{23.09^2 \cdot \pi \cdot 48.05}{360} - \frac{23.09^2 \cdot \sin 48.05}{2} = 25.29 \text{ cm}^2$$

Cubature of the cylindrical part of the barrel:

105.9*25.29*2=−5356.88 $cm^3$

The volume of a portion of the barrel inside the 5-mm thick metal reinforcement is:

(105.7*3.7*0.5+(105.7+97.7*2)*3*0.5)*2=+1294.2 $cm^3$

The adjusted barrel's volume used to calculate the width

225000−5356.88+1294.2=220937 $cm^3$

The barrel's width 220937.3/104.4/105.9=19.98 20 cm

SUMMARY

Aperture height=97.7 cm Aperture width=99.9 cm
Internal height of the prismatic portion=104.4 cm
Internal length of the prismatic portion=105.9 cm
Length of the arch chord=18.8 cm
Height of the arc=2 cm
Radius=23.09 cm
Arc central angle a=48.046°
Area of the segment=25.29
Volume of both cylindrical sections=5356.88 $cm^3$
Volume of the reinforcement around the opening=1294.2 $cm^3$
Adjusted volume=220,937.3 $cm^3$
Internal width of the barrel=20 cm
External height of the barrel=104.6
External length of the barrel=106.1
External width of the barrel=20.2 cm Reinforcement thickness around the opening 5 mm
Reinforcement width at the upper side of the opening=37 mm, and at the screw for
compressing slats=49 mm
Reinforcement on the other three sides=30 mm
The thickness of the metal frame for slats=4 mm
Metal frame width on the upper side=37 mm
Metal frame width on the other three sides=30 mm
Thickness of the pedal for compressing slats 3 mm
Slat length=102.5 cm
Outer width of the legs=36 cm
Height from the bottom of the barrel to the ground=40 cm Advantages of the Invented Barrel Compared to the Conventional Wooden Barrel Usefulness of the invention can be viewed from two perspectives: the manufacturers' and the user customers'.

For the manufacturer:
  Manufacturing the metal part is not much different from making a standard stainless steel barrel and it does not require the introduction of new technologies. Manufacturing the wooden part is much easier than making a barrel; the slats are rectangular in shape as opposed to barrel staves which are prismatic and have tapered ends; in the inventive barrel all slats are identical in size as opposed to barrel staves where we distinguish top/bottom and mantle slats; in traditional barrels, edges of staves are further treated (beveling and cutting the croze near the end of the stave) while in the invention barrel this is not necessary.
  There is no need for bending the slats/staves
  The equal-sized slats enable simpler and more uniform toasting giving the barrel consistent aromatic quality, which is otherwise quite often difficult to achieve.
  The metal part of the barrel allows the mounting of all necessary connecting elements, sensors, heating/cooling systems in a much simpler way than it is the case in wooden barrels.
  The buyer of the barrel remains a faithful consumer of slats for as long as the metal structure is in use.

For the user customers:
  Replacing an arbitrary number of slats with parts made of inert materials (paraffin coated slats, PVC, silicone, stainless steel and even glass) changes the wine volume to wood surface area ratio, i.e. the removal of each slat simulates the volume to surface area ratio in a larger capacity barrel. The oxygenation and extraction rate change appropriately, affecting the barrel's function. So, for example, 45 slats simulate a 309-liter barrel; 40 slats a 439-liter barrel; 35 slats a 656-liter barrel; 30 slats a 1,043-liter barrel; 20 slats a 3,516-liter barrel, and so on.
  By replacing the slats with new ones, one practically has a new barrel (and the production of sets of straight slats would certainly be much cheaper than the cost of making a new wooden barrel), while the old slats can be used in various combinations with the new ones until the desired flavor profile is achieved.
  The combination of different number of slats/staves, of different toast level and made of different types of oaks, will give rise to a huge number of combinations. Each of these combinations would give the wine specific aroma and flavor. Of course, one should be able to buy slates individually. For example: one set of slats and one set of paraffin-covered slats offers 51 combinations (51 simulated volumes). One set of paraffin-coated slats and two sets of plain slats (two different toasting levels, two different types of wood or a combination of new and used slats gives us 1,326 different combinations/aromatic profiles. Three types of wood/toasting level/slats gives us 23,426 combinations; four—316,251 combinations, etc.
  The barrel is easy to clean and sanitize since it can be disassembled without difficulty.
  During vinification, the wine producer can correct the aromatic profile by decreasing the number of slats or by replacing them.
  Space saving: 12 (12*70 cm+13*10 cm=970 cm) barrique barrels 10 cm apart can be fitted along a 10 m long cellar wall, while more efficient storeroom usage is achieved with the invented barrels where 27 (27*36+2*5=982 cm) barrels can be fitted in the same space. Even when the barrique barrels are stacked two tiers high, only 23 barrels can be fitted in the same space as opposed to the invented barrels where the 27 are fitted in a row.
  In order to raise the barrique barrels from the ground and achieve stable positioning, special support structures must be made/purchased. The same applies if they are to be stacked two or more levels high. Replacing the barrel's support elements/legs with support structures that fit on two adjacent barrels would enable two tier high stacking of 53 (27+26) barrels along the 10 m long cellar wall. In order to fit the same number of barrique barrels on the same area, the barrels would have to be stacked six tiers high (12+11+10+9+8+3.)
  Additional functionality would be achieved by mounting wheels on the support elements.
  Although the barrel would be heavier than the conventional barrique barrel, the weight of the replaceable slats is half the weight of the barrique barrel, or approximately 22 kg. Thus, only one person is needed to handle the barrels.
  The slat's height of 4 cm was selected for practical reasons; the total number of slats that fit into the frame is 50; this facilitates the calculation since each slat accounts for 2% of the total wooden body area, thus making it easy for the user customer to calculate the percentage of different types of woods needed when ordering large barrels composed of several kinds of woods.
  Thicker slats can be fitted into the same frame by merely replacing the existing screws with larger ones, thus enabling another way to control microoxydation.

BRIEF DESCRIPTION OF THE DRAWINGS

The accompanying drawings, which are included in the description and which form an integral part of the description of the invention, provide a clearer understanding of the basic principles of this invention.

DETAILED DESCRIPTION OF AT LEAST ONE PREFERRED EMBODIMENT

Figure 1:
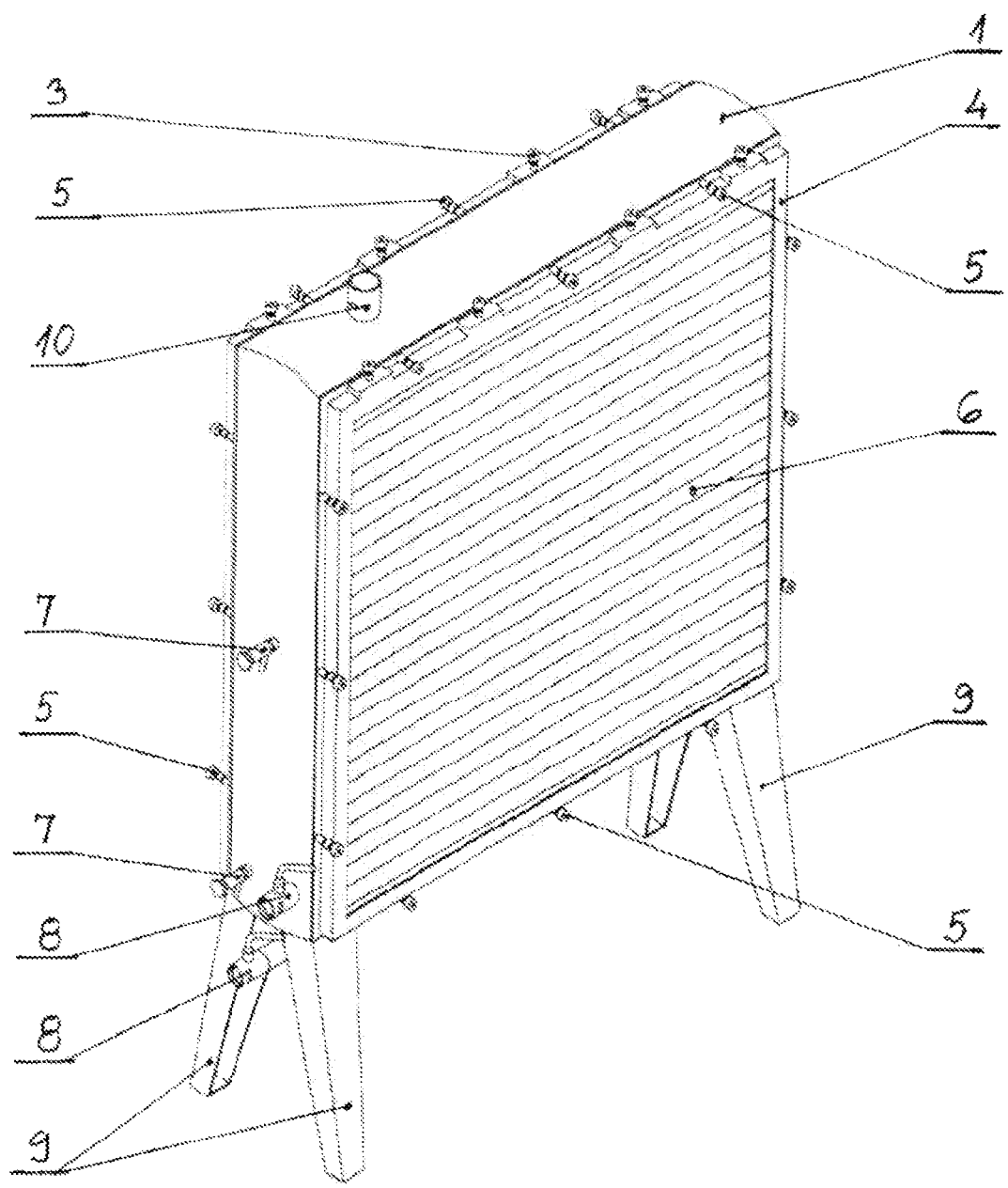
FIG. 1 is a perspective view of the entire barrel
Figures 2, 3:
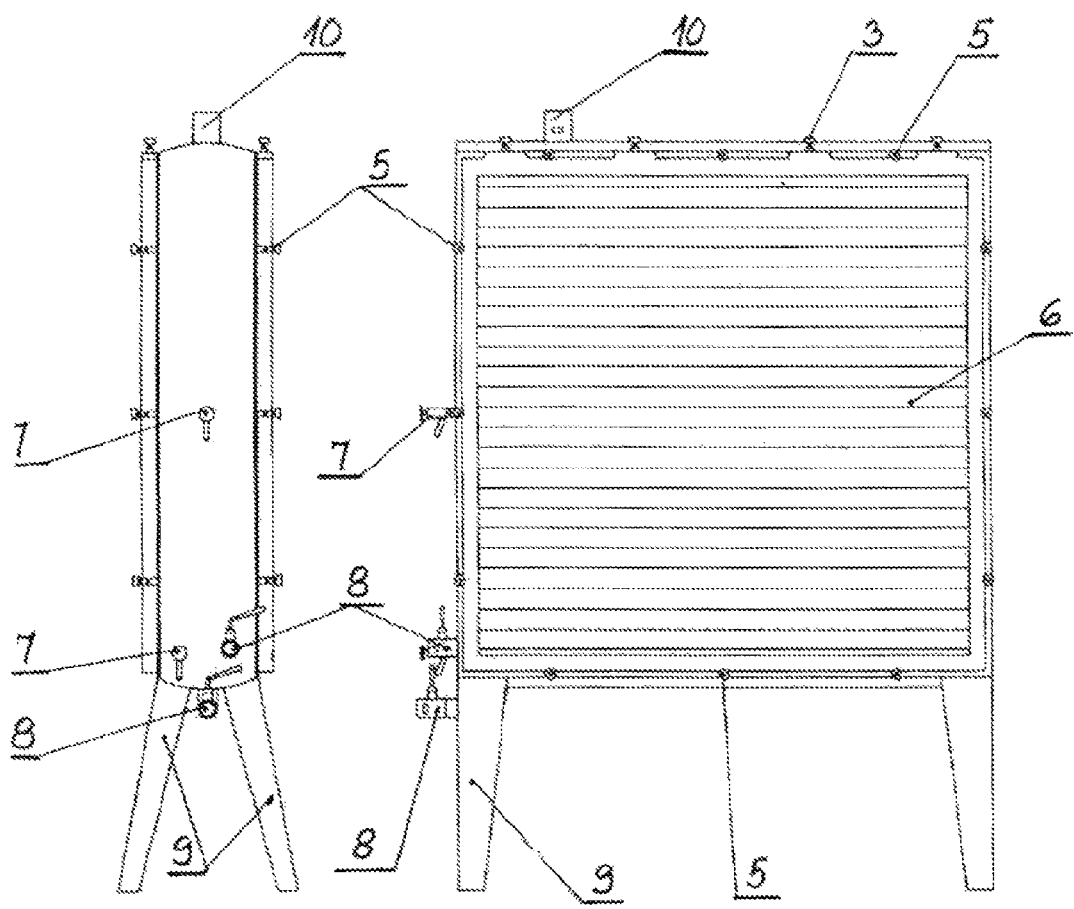
FIG. 2 is the side view of the barrel
FIG. 3 is the perspective view of the barrel
Figure 4:
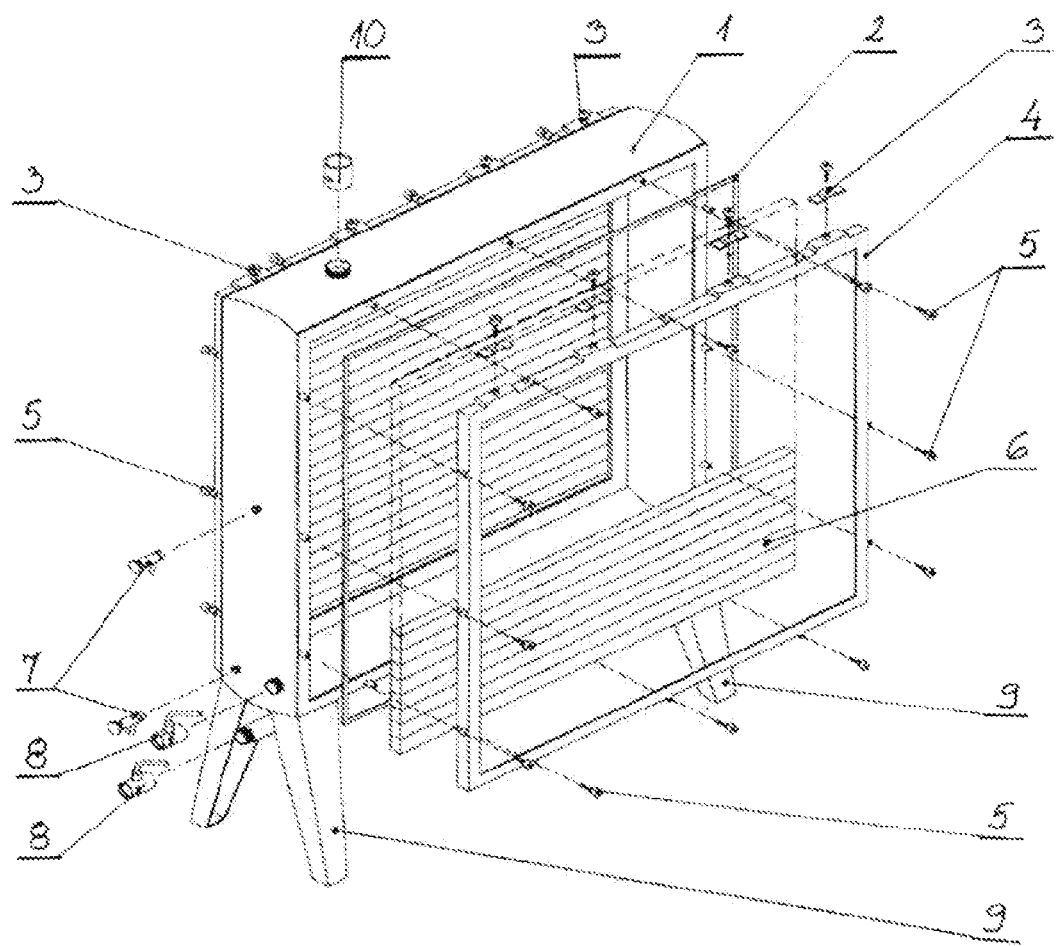
FIG. 4 is a perspective view of the components of the barrel
Figure 5:
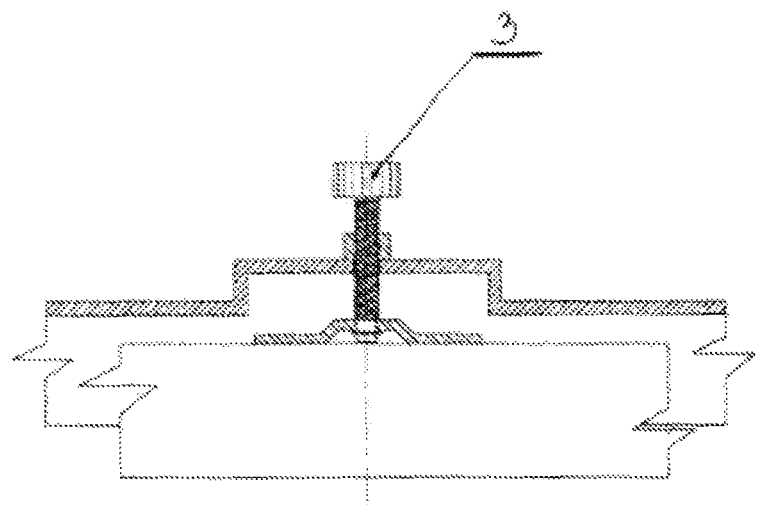
FIG. 5 is an enlarged view of the solution for attaching the metal frame with slats to the meta! body of this invention
Figure 5A:
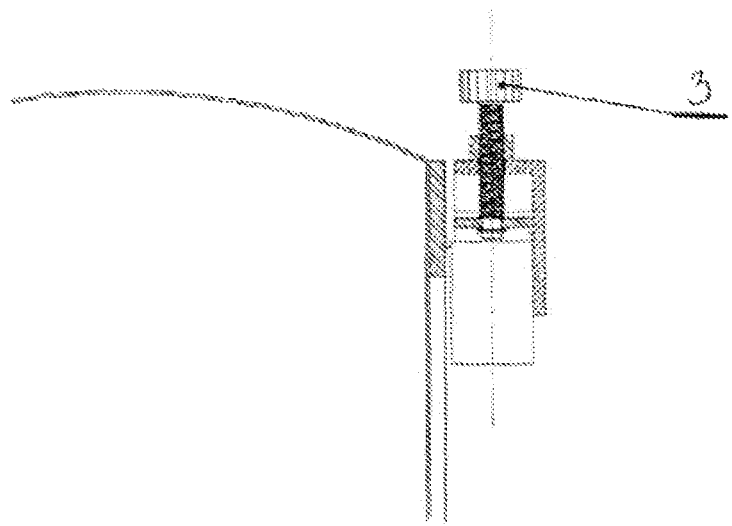
FIG. 5a is an enlarged view of the structural solution for attaching the metal frame with slats to the metal body of this invention
Figure 6:
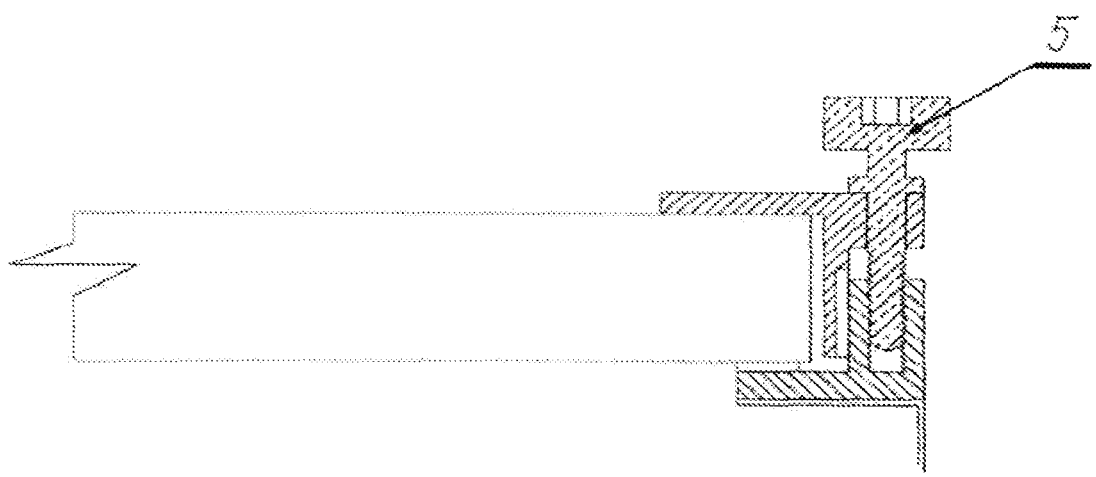
FIG. 6 is an enlarged view of the structural solution for compressing the slats into the metal frame

Referring to FIG. 3, there is shown a barrel composed of a metal body (1), to which a gasket (2) made of appropriate liquid-resistant material is attached. The wooden slats (6) are inserted into a metal frame (4) and tightened in a vertical sense with screws (3). The metal frame (4) filled with slats is attached to the metal body (1) with screws (5). An arbitrary number of various connecting elements (7, 8, 10) for attaching the fermentation airlock, the inert gas system, the pump and sample valves are added to the metal body (1). The structure provides for the barrel to be mounted on metal legs (9) which, apart from providing stable positioning of the barrel, enables the barrels to be arranged in a row 10 cm apart from each other and is also used for raising the body of the barrel (1) 40 cm from the ground, thus facilitating decantation.

APPLICABILITY OF THE INVENTION

The invention provides a practical, durable and useful device that can be economically produced and includes significant improvements over currently available known devices/casks of this type.

Certain changes and adjustments of the present invention can be made by experts without departing from the object and spirit of the invention.

The invention claimed is:

1. A composite stainless steel and wood barrel comprising:
   a metal body;
   a metal frame supporting a plurality of slats, said metal frame disposed in fluid tight sealing arrangement with said metal body;
   said plurality of slats comprising at least one wooden slat of a first type and at least one slat of a second type, wherein said second type is different from said first type in terms of fermentation properties, and
   wherein said first type of slat comprises oak.

2. A composite stainless steel and wood barrel according to claim 1, wherein said barrel comprises metal legs which extend in a direction generally radially from a longitudinal axis of the barrel to provide stable positioning of the barrel while allowing a plurality of the barrels to be arranged in a row 10 cm apart from each other and support the body of the barrel 40 cm from the ground, thus facilitating decantation.

3. A composite stainless steel and wood barrel according to claim 1 wherein said second type of slat comprises an inert material.

4. A composite stainless steel and wood barrel according to claim 3 wherein said inert material comprises at least one material selected from the group consisting of a paraffin coating, PVC, silicone, stainless steel and glass.

5. A composite stainless steel and wood barrel according to claim 3 comprising a plurality of slats of said first type and a plurality of said slats of said second type.

6. A composite stainless steel and wood barrel according to claim 5 wherein said inert material comprises at least one material selected from the group consisting of a paraffin coating, PVC, silicone, stainless steel and glass.

7. A composite stainless steel and wood barrel according to claim 1 wherein said barrel body comprises an upper part and said upper part of said barrel body is slightly curved.

8. A composite stainless steel and wood barrel according to claim 1 wherein said barrel body comprises a lower part and said lower part of said barrel body is slightly curved.

9. A composite stainless steel and wood barrel comprising:
   a metal body;
   a metal frame supporting a plurality of slats, said metal frame disposed in fluid tight sealing arrangement with said metal body;
   said plurality of slats comprising at least one wooden slat of a first type and at least one slat of a second type, wherein said second type is different from said first type in terms of fermentation properties, and
   wherein said second type of slat comprises an inert material.

10. A composite stainless steel and wood barrel comprising:
    a metal body;
    a metal frame supporting a plurality of slats, said metal frame disposed in fluid tight sealing arrangement with said metal body;
    said metal body, said frame and said slats defining a fluid cavity, wherein said fluid cavity has a curved upper portion and a curved lower portion, and
    wherein said plurality of slats comprises a plurality of wooden slats of a first type and at least one slat of a second type, wherein said second type is different from said first type in terms of fermentation properties, and
    wherein said first type of slat comprises oak and said second type of slat comprises an inert material.

11. A composite stainless steel and wood barrel according to claim 10 further comprising an airlock, an inert gas connection, a pump connection and at least one sample valve.

12. A composite stainless steel and wood barrel according to claim 10 further comprising metal legs which extend in a direction generally radially from a longitudinal axis of the barrel to provide stable positioning of the barrel while allowing a plurality of the barrels to be arranged in a row 10 cm apart from each other and support the body of the barrel 40 cm from the ground, thus facilitating decantation.

13. A composite stainless steel and wood barrel according to claim 10 wherein said inert material comprises at least one material selected from the group consisting of a paraffin coating, PVC, silicone, stainless steel and glass.

14. A composite stainless steel and wood barrel according to claim 10 comprising a plurality of slats of said first type and a plurality of said slats of said second type.

* * * * *